United States Patent [19]

Miller et al.

[11] 4,451,493

[45] May 29, 1984

[54] SALAD DRESSINGS OF THE SEPARATING TYPE

[75] Inventors: Donald E. Miller, Strongsville; Charles E. Werstak, Medina, both of Ohio

[73] Assignee: SCM Corporation, New York, N.Y.

[21] Appl. No.: 356,258

[22] Filed: Mar. 8, 1982

[51] Int. Cl.³ .................. A23L 1/24; A23D 5/00; A23D 5/02
[52] U.S. Cl. ...................... 426/602; 426/613
[58] Field of Search .............. 426/330.6, 601, 602, 426/613

[56] References Cited

U.S. PATENT DOCUMENTS

| | | | |
|---|---|---|---|
| 2,916,384 | 12/1959 | Bondi et al. | 99/144 |
| 3,355,302 | 11/1967 | Purves et al. | 99/163 |
| 3,415,658 | 12/1966 | Cunningham et al. | 99/163 |
| 3,514,298 | 5/1970 | Noznick et al. | 426/613 X |
| 3,887,715 | 6/1975 | Cante et al. | 426/570 |
| 3,892,873 | 7/1975 | Kolen et al. | 426/602 |
| 4,120,990 | 10/1978 | Seiden | 426/601 |
| 4,146,652 | 3/1979 | Kahn et al. | 426/613 |
| 4,292,333 | 9/1981 | Bosco et al. | |
| 4,310,561 | 1/1982 | Buddemeyer et al. | 426/613 X |
| 4,343,823 | 8/1982 | Todd, Jr. | 426/650 X |

FOREIGN PATENT DOCUMENTS 919498  1/1973  Canada ................. 99/143

OTHER PUBLICATIONS

Lissant, K. J., "Emulsions and Emulsion Technology", Pt. 1, Marcel Dekker, Inc., N.Y., 1974, pp. 256,257.

Primary Examiner—Robert A. Yoncoskie
Attorney, Agent, or Firm—Richard H. Thomas

[57] ABSTRACT

The present invention resides in a packaged, flavored, non-homogenized oil-and-water salad dressing essentially free of thickening agents and proteins, which has limited stability on hand shaking of the composition, defined as emulsion stability for a limited period of dispensing and use of the composition, followed by reversion to phase separation at the end of such limited period, comprising in parts by weight; about 30–80 parts water, about 20–70 parts of a normally liquid hydrogenated vegetable oil; flavoring amounts of water or oil soluble or dispersible flavor components; and an emulsifying amount of a high HLB, food grade polyglycerol ester emulsifier sufficient to achieve said limited stability, such amount of polyglycerol ester being less than a flavoring amount.

8 Claims, No Drawings

SALAD DRESSINGS OF THE SEPARATING TYPE

The present invention relates to salad dressings, particularly oil-and-water-containing such dressings of low viscosity, and means for obtaining temporarily stable emulsions of such dressings.

BACKGROUND OF THE PRESENT INVENTION

Oil and water salad dressings, such as oil-and-vinegar salad dressings, are well known. These dressings have a low viscosity and are readily pourable. Such dressings may contain spices and flavorings, including solid flavorants and colorants. However, because of the low viscosity of such dressings, they readily separate to multiple phases on standing, specifically a water phase, as oil phase, and a solids phase. Immediately prior to use, the dressings have to be vigorously aggitated and, even then, there may be some separation prior to pouring, and certainly separation following application, for instance to a salad. In this regard, the water and water soluble flavorants, for instance vinegar, will seep to the bottom of the salad while the oil remains coated on the salad ingredients.

It is known in certain salad dressings to use thickeners which have the effect of preventing separation of ingredients. However, these thickeners clearly alter the texture of the dressing, changing the texture from that customarily expected by those desiring a thin dressing of the oil-and-vinegar type of similar type.

In addition, the consumer of an oil-and-vinegar or similar dressing is used to visually seeing the dressing, in a container, separated into the multiple phases prior to use, and thickening agents would be unsatisfactory if employed, since they would tend to hold such a dressing in a dispersed condition for a prolonged period of time.

By the present invention, an oil-and-water dressing is provided which has the traditional appearance and viscosity of a conventional thin dressing such as an oil-and-vinegar or a similar dressing, prior to use, but which on shaking becomes dispersed and remains dispersed for a short period of time, to permit dispensing and use, and which reverts to the traditional multiple phase form on standing. This is accomplished without the use of thickeners and viscosity buildup in the dressing.

U.S. Pat. No. 4,120,990, to Seiden, describes a cooking and salad oil composition said to offer improved fat absorption of foodstuffs fried therein and improved blendability in oil-and-vinegar salad dressings, consisting essentially of a liquid glyceride base oil and a small amount of polyoxyalkaline propylene glycol ester emulsifier. The patent describes what is referred to as a blendability test, in which a salad dressing containing 100 grams vinegar, 182 grams of oil, 6 grams of salt, and varying amounts of the polyoxyalkaline propylene glycol ester emulsifier was submitted to vigorous shaking action. The times necessary for the vinegar phase to reach a 30 milliliter or 60 milliliter separation from the water was recorded. By way of example, the patent points out that at about 0.1% emulsifier, stability (30 milliliter separation) was retained for about 9 minutes. At 1% emulsifier, stability was increased to about 15 minutes. The patent seems to stand primarily for less fat absorption of foodstuffs and phase separation seems to be secondary. A phase separation of 30 milliliters is quite substantial.

Canada Pat. No. 919,498 describes aqueous emulsions comprising an essential oil, water, and polyglycerol partial ester. Included in a list of polyglycerol esters are such compounds as decaglycerol monooleate. The emulsions are homogenized and spray dried. No reference is made in the patent to the preparation of salad dressings. The patent is not concerned with obtaining non-homogenized compositions which have limited stability only on shaking.

U.S. Pat. No. 2,916,384 describes a low-calorie, Italian dressing having 3–5% olive oil, 0.5–0.8% gum, 0.25–0.4% emulsifier gum (agar), vinegar and water. The proportions are not those of a traditional Italian dressing, and the patent does not disclose the use of a lipid emulsifier. Stability may be attributable to the use of a gum and resulting viscosity buildup.

A salad oil having anti-spattering properties is described in U.S. Pat. Nos. 3,415,658 and 3,355,302. The oils contain a polysorbate and, as an adjunct emulsifier, a polyglycerol polyester. Examples of polyglycerol polyesters used are decaglycerol decaoleate and decaglycerol trimyristate. They are said to hold the polysorbates in suspension in the oil during storage. The patents are referred to in the above mentioned U.S. Pat. No. 4,120,990 as teaching the "blendability of salad oil in vinegar" but appear to stand, at least primarily, for improved anti-spattering properties. The emulsifiers of the present invention are neither disclosed nor suggested in the patents.

Prior U.S. Pat. No. 3,887,715 suggests that emulsifiers are commonly used in salad dressings, but the emulsifier disclosed in the patent is a lipoprotein such as is found in egg yolk. Similarly, U.S. Pat. No. 3,892,873 describes the use of milk serum protein for salad dressings.

SUMMARY OF THE PRESENT INVENTION

The present invention resides in a packaged, flavored, non-homogenized oil-and-water salad dressing essentially free of thickening agents and proteins, which has limited stability on hand shaking of the composition, defined as emulsion stability for a limited period of dispensing and use of the composition, followed by reversion to phase separation at the end of such limited period, comprising in parts by weight; about 30–80 parts water, about 20–70 parts of a normally liquid hydrogenated vegetable oil; flavoring amounts of water or oil soluble or dispersible flavor components; and an emulsifying amount of a high HLB, food grade polyglycerol ester emulsifier sufficient to achieve said limited stability, such amount of polyglycerol ester being less than a flavoring amount.

For purposes of the present application, the term "emulsion stability" means free of any visibly discernable separation of phases.

In a preferred embodiment of the present invention, the water is supplied as an ingredient of vinegar, the salad dressing thus containing a flavoring amount of acetic acid.

Preferably, an emulsifying amount of the polyglycerol ester emulsifier is 1–3 parts.

Preferably, the salad dressings of the present invention have a viscosity such that they are readily pourable at refrigeration temperatures less than about 1500 cps at 40° F., as measured on a Brookfield SynchroLectric Viscometer, Model LVF, at 60 RPM. Conventional non-separating dressings will generally have viscosities above about 1500 cps at 40° F., and the emulsifiers of the present invention would not be needed in such dressings.

DETAILED DESCRIPTION OF THE PRESENT INVENTION

The emulsifiers for use in the formulations of the present invention are the high HLB polyglycerol esters having HLB values ranging from about 10 to about 16. These esters are generally a mixture of mono-unsaturated and saturated fatty acid esters of a mixture of polyglycerols in which the range of polyglycerol is from octaglycerol to decaglycerol, with one or two fatty acyl ester groups per molecule. The mono-unsaturated and saturated fatty acids contain 16 to 18 carbon atoms and are typically derived from corn oil, cottonseed oil, lard, palm oil, peanut oil, safflower oil, sesame oil, soybean oil, tallow, and tall oil and the fatty acids derived from these substances may be either hydrogenated or unhydrogenated. The polyglycerol mixture is prepared by the polymerization of glycerol with an alkaline catalyst, as exemplified in U.S. Pat. No. 3,637,774, or an acid catalyst as exemplified in U.S. Pat. No. 3,968,169. Polyglycerol esters are obtained by then esterifying the polyglycerol by reaction with fatty acids in direct esterification or by reaction with fats and oils in an interesterification process. Suitable polyglycerol esters broadly have a hydroxyl value of about 400 to 600, a saponification number of about 60 to 100, and acid values of less than about 10. The range of possible polyglycerol esters is small and can range from a mono-esterified octaglycerol to a diesterified decaglycerol, with the iodine value of the fatty acid ranging from 0 to 90.

Particularly suitable polyglycerol esters of fatty acids useful in the process of the present invention are the polyglycerol monoesters such as octaglycerol monooleate and octaglycerol monostearate. Octaglycerol monooleate (8-1-O) has a calculated HLB value of about 13-16 and is of fluid consistency at ambient temperature. It typically contains about 60-68% oleic acid and has a hydroxyl number of 500-570, a saponification number of 68-85 and an acid number of under 4.1.

Another suitable polyglycerol ester of fatty acids useful in the process of the present invention is octaglycerol monostearate (8-1-S). This compound has a calculated HLB value of about 13 and is of solid or plastic consistency at ambient temperature, having a Mettler Dropping Point of about 52°-57° C. Octaglycerol monostearate typically contains about 60-68% stearic acid and has a hydroxyl number of 500-570, a saponification number of 77-88, an acid number of under 5, and an IV of about 65-85.

The amount of polyglycerol ester employed is an emulsifying amount. Normally, this will be within the range of about 0.1 parts (per 100 parts of oil/water/emulsifier composition) to about 3 parts by weight. Above about 3 parts by weight, off-flavors may be experienced. Below about 0.1 parts by weight, insufficient stability is obtained in the sense that the composition separates before it can be dispensed or used. At about 0.5 parts concentration, about 15 minutes pouring and use time is obtained. At about 1 part concentration, the time is extended to about 30 minutes, and at about 2 parts, up to about 1 hour. At about 3 parts, the stability is extended somewhat beyond 1 hour.

Without any emulsifier, an oil-and-vinegar dressing for salads, even after vigorous agitation, separates almost immediately into two layers.

In this regard, the compositions during the time frames or periods indicated are homogeneous and remain readily pourable as a dispersed oil-and-water mixture. Following the time frames or periods indicated, a reversion to separate phases or layers occurs.

These observations are applicable to the presence of solid phase particulate as well as to the oil-and-water phases. For instance, with about 1 part polyglycerol ester, the solid particles remain dispersed in the composition for about 30 minutes and, even when dispensed onto a salad, will remain on the salad in the dispersed condition for that period of time. After 30 minutes, phase separation occurs.

The present invention may be used with a number of liquid vegetable oils which include, for example, soybean oil, winterized cottonseed oil, sunflower seed oil, peanut oil, mustard seed oil, safflower seed oil, dewaxed corn oil, and like vegetable oils. Usually, the vegetable oils are not hydrogenated and have an iodine value preferably between 120-130. The liquid vegetable oils are liquid at room temperature and preferably have a melting point of less than about 50° F. Preferred vegetable oils are those that do not cloud up, i.e. they remain clear at refrigeration temperatures (about 40° F.).

It is possible to use a hydrogenated oil.

One suitable oil is that marketed by SCM Corporation under the trademark Durkex 100. This oil is a partially hydrogenated soybean oil having a Wiley Melting Point of about 65° F. and an SFI at 50° F. of about 11 maximum. Durkex 100 has an IV of about 85-90 maximum.

Another oil is that marketed by SCM Corporation under the trademark Durkex 500. This oil is a hydrogenated fractionated soybean/cottonseed oil mixture having a Wiley Melting Point of about 63° F., a free fatty acid content of about 0.05% (maximum), and an IV of about 74-81. The solid fat index for this oil is

| 50° F. | 14-20 |
| 70° F. | 3 max. |

Other oils, such as margarine oils, which are bland in flavor, can be employed. Generally, such oils would be those conventionally used in salad oil dressings, and the suitable oils which can be used would be known to those skilled in the art.

The amount of oil employed in the compositions of the present invention broadly is that employed conventionally in a salad dressing, and for most dressings this will be about 30-80 parts, preferably about 40-60 parts by weight.

The compositions of the present invention preferably will contain flavoring amounts of suitable flavorings and coloring amounts of suitable colorants. The flavorings and colorants can be oil soluble or water soluble or can be solid particulate which is neither water nor oil soluble. Examples of such flavorings and colorants will be known to those skilled in the art; one specific example is the use of vinegar, which contains acetic acid, as a flavorant.

Generally speaking, the remainder of the salad dressing of the present invention will be water. In this regard, it is a characteristic of the present invention that no thickening agents or gums need be added. Thus, the compositions of the present invention have a viscosity, following shaking, essentially the same as that of a conventional oil and water, for instance oil-and-vinegar, dressing.

The present invention, however, broadly encompasses the use of other ingredients, even a thickening agent, in non-thickening amounts. By non-thickening amount, it is meant that the viscosity of the composition is not appreciably increased, i.e., that the viscosity of the composition remains essentially in the range of 100 to about 1500 centipoises, at 40° F., as measured on a Brookfield Viscometer, Model LVF, using appropriate spindles at 60 rpm. The critical property required is that it remain readily pourable and capable of forming a thin film on salad components with which it is used.

The compositions or salad dressings of the present invention can be prepared by simply blending the oil, water, and emulsifier when using octaglycerol monooleate (which is a liquid). The ingredients are preferably stirred, by any agitation, to disperse the octaglycerol monooleate in the form of fine droplets throughout the water and oil phases, and to coat any solid particulate that may be employed. In the case of the use of octaglycerol monostearate, it is desirable to heat the polyglycerol ester until it is in fluid form, and then add it, with agitation, to the oil and water phases, which preferably are also at the same elevated temperature, to disperse the polyglycerol ester within the two phases. However, homogenization of the compositions is not required. In this regard, the stability of the compositions or dressings, in the form of a dispersion, for dispersing and use, is obtained by simply shaking the composition by hand, for a short period of time.

The following examples are illustrative of the concepts of the present invention.

EXAMPLE 1

The following formulations were prepared:

| SALAD OIL DRESSING | |
|---|---|
| dewaxed corn oil | 60% |
| vinegar | 40% |
| octaglycerol monooleate (8-1-O) | 1–3% |

The polyglycerol ester and vinegar were heated together to about 130° F., to disperse the emulsifier in the aqueous phase. The dewaxed corn oil was then added to the vinegar mix and heated to 130° F. The product was allowed to cool to room temperature, and was evaluated against a control which contained no added octaglycerol monooleate. The room temperature samples were subjected to hand-shaking similar to that required for a commercial oil-and-vinegar dressing. The control containing no emulsifier showed immediate phase separation after shaking. The experimental samples, however, remained stable (that is, the fat dispersed in the aqueous phase) for a long enough time for the dressing to be applied to a salad. There was a direct correlation between the level of added octaglycerol monooleate and stability of the emulsion after shaking.

Following the period of stability, the composition reverted to separate oil-and-water phases.

TABLE I

| PGE concentration parts by weight | Approximate period without visual phase separation |
|---|---|
| 0.5 | 15 minutes |
| 1.0 | 30 minutes |
| 2.0 | 60 minutes |

TABLE I-continued

| PGE concentration parts by weight | Approximate period without visual phase separation |
|---|---|
| 3.0 | more than 60 minutes |

At 3% concentration of 8-1-O, the viscosity was about 125 cps (40° F.).

EXAMPLE 2

The following composition was made:

| dewaxed corn oil | 60% |
|---|---|
| vinegar | 40% |
| octaglycerol monostearate (8-1-S) | 1–3% |

The compositions of this example were prepared following the procedure of Example 1, except that heating was to about 140° F. At all four levels of emulsifier use, excellent results were obtained in terms of stability of the composition. At 2% concentration of 8-1-S, the viscosity was about 1200 cps (40° F.).

The vinegar which was employed was a white, distilled, commercial vinegar containing about 6% acetic acid.*

*White vinegar marketed by Heritage House, having 5% acidity (50 grains).

By contrast, similar experiments carried out with triglycerol monoshortening, a low HLB emulsifier, were unsatisfactory. With regard to the use of polysorbates, at effective levels, these would give off-flavors. Similar results would be experienced with the ethoxylated mono-diglycerides.

The present invention is useful with other low viscosity, normally separating type dressings than oil-and-vinegar dressings; for instance, Italian, Caesar, red wine and vinegar, and French.

The following Table 2 gives viscosity data for representative dressings of the separating type and non-separating type, and comparative data for the dressings of the present invention. Viscosity data was taken at both 40° F. and 73° F.

TABLE 2

| Salad Dressing Type | Separating type yes/no | Viscosity at 73° F. cps | Viscosity at* 40° F. cps |
|---|---|---|---|
| Caesar | yes | 165 | 260 |
| French | yes | 940 | 1180 |
| French | no | 1520 | 1880 |
| Italian | yes | 315 | 380 |
| Italian | no | 3200 | 4800 |
| Red Wine Vinegar | yes | 100 | 130 |
| 8-1-O (Example 1) | | 75 | 125 |
| 8-1-S (Example 2) | | 540 | 1200 |

*Brookfield Synchro-Lectric Viscometer Model LVF, 60 RPM

What is claimed is:

1. A packaged, flavored, non-homogenized oil-and-water salad dressing of the separating type, which has improved limited stability during usage upon hand shaking of the salad dressing yet reverts to phase separation after use of such dressing, comprising in parts by weight;

about 30–80 parts water;

about 20–70 parts of a normally liquid hydrogenated vegetable oil;

flavoring amounts of water or oil soluble or dispersible salad dressing flavor components; and an emulsifying amount of a food grade polyglycerol ester emulsifier having an HLB value in the range of about 10–16, said emulsifying amount being sufficient to achieve said improved limited stability, said amount of polyglycerol ester being less than a flavoring amount.

2. The salad dressing of claim 1 containing 40–60 parts of water.

3. The salad dressing of claim 2 wherein said polyglycerol ester is a monoester.

4. The salad dressing of claim 2 wherein said polyglycerol ester emulsifier is selected from the group consisting of octaglycerol monooleate and octaglycerol monostearate.

5. The salad dressing of any one of claims 1, 2 and 3, wherein the water contains acetic acid derived from vinegar.

6. The dressing of any one of claims 1, 2 and 3 prepared by adding the polyglycerol ester emulsified to the water at an elevated temperature sufficient to disperse said emulsifier, and then blending the water/emulsifier mix and oil at such temperature.

7. The dressing of claim 1, 2, or 3 having a viscosity of about 100–1500 centipoises at about 40° F., as measured on a Brookfield Synchro-Lectric Viscometer, Model LVF, at 60 RPM.

8. A method for making a packaged, flavored, oil-and-water salad dressing of the separating type which has improved limited stability during usage upon hand shaking of the salad dressing, yet reverts to phase separation after use of such dressing, comprising the steps of
  (1) blending together sufficient to mix and disperse but not to homogenize about 30–80 parts by weight water, about 20–70 parts by weight of a normally liquid hydrogenated vegetable oil, flavoring amounts of water or oil soluble or dispersible flavor components, and an emulsifying amount of a food grade polyglycerol ester emulsifier having an HLB value in the range of about 10–16, said emulsifying amount being sufficient to achieve said improved limited stability but, less than a flavoring amount;
  (2) said blending taking place at a temperature sufficient to disperse said emulsifier.

* * * * *